Patented Nov. 19, 1935

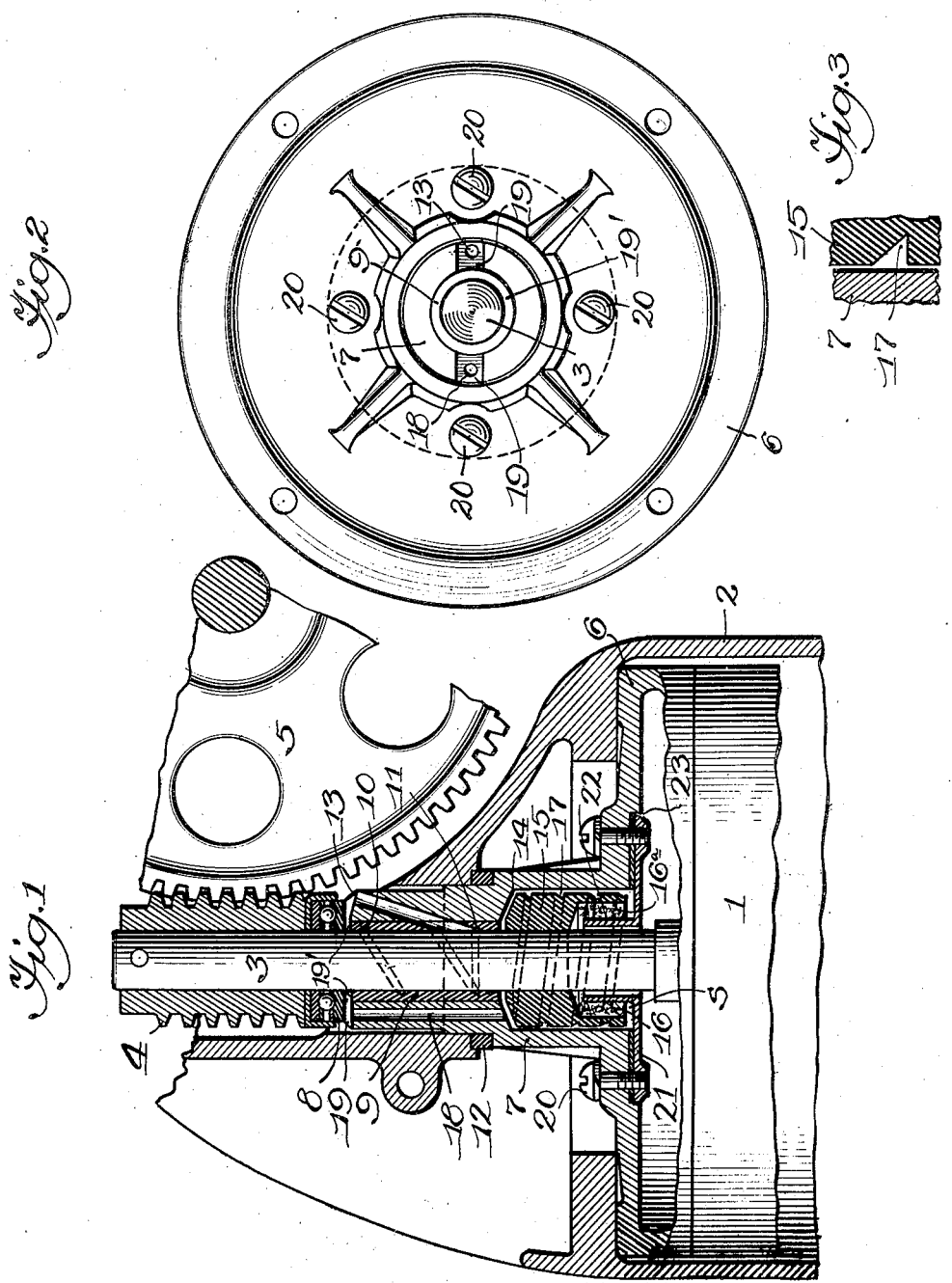

2,021,633

UNITED STATES PATENT OFFICE 2,021,633

ROTARY OIL SEAL

John Mikulasek, Newton, Iowa, assignor to The Maytag Company, Newton, Iowa, a corporation of Delaware Application December 23, 1932, Serial No. 648,577

11 Claims. (Cl. 308—170)

The present invention relates to oil seals and more particularly to a novel arrangement to circulate the lubricating oil through the bearing on the shaft of an electric motor or the like and to return the waste oil back into the bearing. The invention also includes a means for positively preventing this waste oil from entering the motor.

Among the objects of my invention is to provide a means for positively preventing the gravitation of oil down the shaft of a vertical motor, as is employed in the use of an ironer, or other mechanism, so that such oil cannot enter into the motor.

Another object is to provide a seal that is pressed or otherwise secured to the shaft and revolves therewith so as to eliminate all friction and added load on the motor. As a further result of eliminating all friction my seal will not wear out but will last as long as the motor.

Another object of my invention is to provide a complete and continuous circulation of oil through the whole bearing on the shaft of the motor which will not be interrupted in any way by the action of the seal.

Another object is to provide a means for storing any excess oil during shipment or movement of the motor and to prevent the oil from leaking out or getting into the motor during said movement. This stored oil will be pumped up again to be used when the motor is operated to lubricate the bearing.

Another object of my invention is to provide a seal that will act positively regardless of whether or not the oil is freely running. The present oil seals that operate by friction will sometimes slip around the shaft or revolve slowly therewith, particularly when the oil is cold or stiff, but by pressing, pinning or otherwise tightly fitting my seal to the shaft, this difficulty is eliminated and it is impossible for the oil to get between the shaft and the seal.

Another object of my invention is to provide an oil seal which will positively force any excess oil upward and away from the motor and which will cooperate with the other parts of the motor to circulate this oil through the bearing.

Further objects are to provide a construction of maximum simplicity, efficiency, economy, and ease of assembly, operation, repair and maintenance, and such further objects, advantages, and capabilities as will later more fully appear, and are inherently possessed thereby.

The invention further resides in the combination, construction and arrangements of parts illustrated in the accompanying drawing, and while there is shown therein a preferred embodiment, it is to be understood that the same is susceptible of modification and change, and comprehends other details, arrangements of parts, and constructions, without departing from the spirit of the invention.

In the drawing:

Fig. 1 is a view in vertical cross section through the oil seal.

Fig. 2 is a top view of the motor head.

Fig. 3 is a view in vertical cross section of the side of a portion of the oil seal showing the shape of the groove.

Referring more particularly to the disclosure in the drawing showing my preferred embodiment, the upper part of the motor 1 is encased in housing 2 and provided with a shaft 3. The upper part of this shaft is provided with a worm 4 cooperating with the worm wheel 5 of an ironer or other mechanism (not shown). The shaft 3 enters the motor through the motor head 6 which has an extended neck 7 surrounding the shaft. The shaft is also provided with a thrust bearing 8, which may be of the ball bearing type as shown in the drawing, and bearing bushing 9 provided with helical grooves 10 and annular groove 11. This latter groove is positioned a short distance above the lower end of the bearing. Between the motor head and housing is provided a gasket 12.

At the top of the motor head neck and extending downwardly therethrough and also through the bearing 9 to the shaft is the oil intake passage 13 which reaches the shaft at the groove 11 in the bearing. Immediately below the bearing, the motor head is provided with an enlarged cavity 14 in which rotates the oil seal or slinger 15 which is pressed, pinned or otherwise tightly secured to the shaft. In the lower part of the seal is provided a hollow portion 16 which is preferably filled with felt or other absorbent material 16ª. On the sides of the seal is a helical groove 17 more or less similar to the groove 10 in the bearing.

In the neck of the motor head is oil outlet 18 extending from the seal to the top of the neck and connecting with the intake passage 13 by radial grooves 19 and annular clearance 19' around the shaft 3. It is of course understood that the oil may be sent elsewhere if it is not desired to use it again. In such a case there is no annular clearance provided.

Below the seal and connected to the under side of the motor head by bolts or the like 20 is the bottom plate 21 having a neck portion 22 surrounding the shaft and extending upwardly into the hollow space 16 to a point near the top thereof. A sump S is thereby formed in the bottom portion of the cavity 14. 23 represents a gasket between the bottom plate and motor head.

In operation the oil enters the intake 13 and reaches the shaft at the annular groove 11 in the bearing. The helical groove carries the oil upward along the shaft and lubricates it and both bearings. Should any oil escape below the groove 11 it will be caught by the seal and forced upward by the slinger 15 through the outlet 18 and will reenter the neck through the intake 13.

After the motor has stopped, gravity might cause some of the oil to ooze down around the seal. This will be stored in the sump until the motor is operated again, when the oil will be forced outwardly by centrifugal force and then the groove 17 will cause it to be carried upward where the compression force of the rotating seal will cause it to be carried through the outlet 18 to be used again as previously described. In case the motor should be upturned or placed on its side when moved, the hollow portion in the ring, which is of course part of the sump, is filled with felt or other absorbent material to absorb the oil and prevent it leaking during said movement.

The helical grooves are preferably of saw tooth shape, whereby a positive upward movement of the oil during the rotation of the shaft is assured, although other shapes of groove may be used if desired.

It will be noted that the intake hole terminates above the bottom of the bearing and is spaced from the seal. By reason of this, it is assured that the oil will go out through the outlet and the circulation of forced air and oil that comes from the slinger will be shut off from the inlet. Otherwise, the oil and bubbles of air might disrupt the normal oil circulation by passing up through the intake pipe and prevent the entering oil from reaching the shaft.

By reason of the above description and the disclosure in the drawing, it will be readily seen that I have provided a novel oil circulating system and a positive means of preventing any oil which is used to lubricate the shaft of a motor from entering into said motor.

Having thus disclosed my invention,
I claim:

1. A seal means for a vertically disposed rotating motor shaft, comprising a motor head having a sleeve through which said shaft extends, a bearing at the upper end of said sleeve, an oil inlet extending from the top of said sleeve through the bearing to the shaft, a ring in the sleeve and tightly secured to the shaft, an outlet hole in said sleeve extending upward from said ring, means on said ring to force any excess oil up said outlet while the motor is operating, and means under said ring for storing said excess oil while the motor is idle.

2. A means for sealing a vertical rotating shaft comprising a motor head having a neck through which said shaft extends, a cavity in said neck, a ring in said cavity said ring being tightly attached to said shaft and rotating therewith, a groove on said ring, an outlet in said neck, and communicating with said groove, a hollow portion in said ring, absorbent material in said hollow portion, and a bottom plate below said ring and attached to said motor head, said plate having a neck portion surrounding said shaft and extending into said hollow portion.

3. A system for circulating oil around a vertical motor shaft, comprising a motor head having a neck through which said shaft extends, a thrust bearing above said neck, a bearing around said shaft at the upper part of said neck, an oil inlet at the top of said neck and extending therethrough and through said second mentioned bearing to said shaft, a ring below said bearing and tightly connected to said shaft so as to rotate therewith, the outside of said ring having a helical sawtooth groove, said ring having a cavity at its lower end, absorbent material in said cavity, a plate below said ring and surrounding said shaft and having a sleeve extending into said cavity, means for tightly connecting said plate to said motor head, an outlet hole in said neck extending from above said ring to the top of said neck, and means connecting said intake and outlet holes.

4. Means for sealing a motor shaft comprising a motor head, a ring having one end portion so constructed and arranged as to be pressed on said shaft, the other end portion of said ring having an axial recess therein formed in such manner as to provide an annular flange, a bottom piece secured to said head and provided with an annular flange arranged to surround the shaft and extended axially into said recess, said head having an oil outlet conduit therein so located that its receiving end is adjacent to the first mentioned end of said ring but axially spaced with respect thereto, the periphery of said ring having an helical groove therein extending from the free edge of the flange to a position adjacent to the receiving end of said conduit.

5. Means for sealing a motor shaft comprising a motor head provided with an extended neck, a ring having one end portion so constructed and arranged as to be pressed on said shaft, the other end portion of said ring having an axial recess therein formed in such manner as to provide an annular flange, said ring being located within said neck, a bottom piece secured to said head and provided with an annular flange arranged to surround the shaft and extended axially into said recess, said neck having an oil outlet conduit therein so located that its receiving end is adjacent to the first mentioned end of said ring but axially spaced with respect thereto, the periphery of said ring having an helical groove therein extending from the free edge of the flange to a position adjacent to the receiving end of said conduit.

6. Means for sealing a motor shaft comprising a motor head provided with an extended neck having an enlarged portion and an axial tubular extension, a ring having one end portion so constructed and arranged as to be pressed on said shaft, the other end portion of the ring having an axial recess therein formed in such manner as to provide an annular flange, said ring being located in the enlarged chambered portion of said neck, a bottom piece secured to said head and provided with an annular flange arranged to surround the shaft and extended axially into said recess, the axial tubular extension of said neck having an oil outlet conduit therein so located that its receiving end communicates with the enlarged chambered portion at a position which is adjacent to the first mentioned end of said ring but axially spaced therefrom, the periphery of said ring having an helical groove therein extending from the free edge of the flange to a position adjacent to the receiving end of said conduit.

7. A sealing means for a vertically disposed rotatable motor shaft comprising a motor head provided with an extended neck, a bearing located within the upper portion of said neck, said bearing and said neck having an oil inlet extending from the top of the sleeve through the bearing to the shaft, said neck also having an oil outlet conduit therein, a ring having one end portion so constructed and arranged as to be pressed on the shaft, the other end portion of the ring having an axial recess therein formed in such manner as to provide an annular flange, said ring being located within said neck, a bottom piece secured to said head and provided with an annular flange arranged to surround the shaft and extended axially into the recess, the upper end of said ring being adjacent to the receiving end of said oil outlet conduit but axially spaced therefrom, the periphery of said ring having an helical groove therein extending from the free edge of the flange to a position adjacent to the receiving end of said oil outlet conduit, said bottom piece and the flange thereof being so constructed and arranged as to provide a space for storing excess oil while the motor is idle.

8. A system for circulating oil around a vertical oil shaft comprising a motor head having an oil inlet conduit and an oil outlet conduit therein, a bearing in said head having grooves connecting with said inlet conduit, a ring also within said head, said ring having one end portion so constructed and arranged as to be pressed on said shaft, the other end portion of said ring having an axial recess therein formed in such manner as to provide an annular flange, a bottom piece secured to said head and provided with an annular flange arranged to surround the shaft and extended axially into said recess, the periphery of said ring having an helical groove therein extending from the free edge of the flange to a position adjacent the receiving end of said outlet conduit, and so constructed and arranged as to force any excess oil upwardly through said outlet, and means providing communication between the oil inlet and the oil outlet.

9. A lubricating system comprising, in combination, a housing for containing a supply of lubricant; a bearing support carried by the housing; a bearing in said support rotatably supporting a shaft, said bearing support and said bearing having passages extending above the maximum lubricant level, and providing communication between the shaft and the housing above the maximum lubricant level in the housing; meshing gears, one being carried by the housing and dipping into the lubricant supply, and another being mounted on said shaft; one of the gears delivering lubricant to one of said passages; lubricant flow reversing means mounted on the shaft for forcing lubricant from said one passage through the other passage into the housing, said flow reversing means comprising a partially hollowed cylindrical member having a spirally disposed lubricant conveying groove therein, and a cylindrical chamber cooperating with the cylindrical member; and an annular member covering a portion of the shaft within the hollow of said cylindrical member to a height sufficient to exceed that of the lubricant retained within the cylindrical chamber.

10. A lubricating system comprising in combination, a lubricant supply chamber having a supply of lubricant therein; a bearing support adjacent the said lubricant supply chamber, and having a bearing supported thereby; means for conveying lubricant to said bearing from said supply chamber; a shaft rotatable in said bearing; lubricant flow reversing means mounted on said shaft for forcing lubricant back to said chamber, comprising a partially hollowed cylindrical member having a spirally disposed oil conveyor thereon; said bearing providing a communicating passage for said lubricant; and an annular member covering a portion of said shaft within the hollow portion of said cylindrical member to a height sufficient to exceed that of the lubricant retained around the said annular member.

11. A lubricating system comprising, in combination a chamber for containing a supply of lubricant, a tubular member extending through an opening in a wall of the chamber; a bearing carried by said member; a second chamber provided by said tubular member and located so as to receive lubricant from said bearing; ducts provided by said tubular member for conducting lubricant to said bearing and for returning lubricant from the second chamber to the first chamber independently of said bearing; a shaft passing through the second chamber and into said bearing; and means within the second chamber and operated by the shaft for causing lubricant to flow against gravity from the second chamber to the first chamber.

JOHN MIKULASEK.